United States Patent [19]

Hashimoto et al.

[11] 4,192,833

[45] Mar. 11, 1980

[54] LIQUID-GAS CONTACTOR AND LIQUID-GAS CONTACT PROCESS

[75] Inventors: Noboru Hashimoto; Hideo Fukuda; Setsuo Shibata, all of Yokohama, Japan

[73] Assignee: JGC Corporation, Tokyo, Japan

[21] Appl. No.: 867,966

[22] Filed: Jan. 9, 1978

[30] Foreign Application Priority Data

Jan. 17, 1977 [JP] Japan .................................. 52/2917

[51] Int. Cl.² ........................ B01D 47/02; B01D 47/06
[52] U.S. Cl. .................................. 261/36 R; 55/89;
55/93; 55/95; 55/238; 55/248; 261/126;
261/117
[58] Field of Search ................. 55/89, 90, 93, 95, 223,
55/224, 234, 235, 238, 244, 245, 248, 256, 257
R, 338, 418; 261/36 R, DIG. 75, 126, 29, 117;
423/215.5

[56] References Cited

U.S. PATENT DOCUMENTS

| | | | |
|---|---|---|---|
| 970,654 | 9/1910 | Sepulche | 55/89 |
| 1,979,189 | 10/1934 | Bowers | 55/90 |
| 2,858,903 | 11/1958 | Goetz et al. | 55/89 |
| 3,210,914 | 10/1965 | Eckert | 55/90 |
| 3,239,999 | 3/1966 | Price | 55/244 |
| 3,435,593 | 4/1969 | Nordone | 55/418 |
| 3,520,113 | 7/1970 | Stokes | 55/223 |
| 3,635,000 | 1/1972 | Brown | 55/89 |
| 3,870,082 | 3/1975 | Holl | 55/223 |
| 3,884,653 | 5/1975 | Capulli et al. | 55/223 |

FOREIGN PATENT DOCUMENTS

| | | | |
|---|---|---|---|
| 364234 | 11/1922 | Fed. Rep. of Germany | 55/93 |
| 1034147 | 7/1953 | Fed. Rep. of Germany | 55/89 |
| 2405669 | 9/1974 | Fed. Rep. of Germany | 55/223 |

*Primary Examiner*—David L. Lacey
*Attorney, Agent, or Firm*—Blanchard, Flynn, Thiel, Boutell & Tanis

[57] ABSTRACT

A liquid-gas contactor which comprises a first liquid-gas contacting region of which the lower part is provided with a gas inlet and the upper part is provided with a liquid feed inlet and a second region through which flows a gaseous fluid comprised of particles of at least a portion of the liquid fed into said first contacting region suspended in the greater part of the gas supplied through the gas inlet. The first and second regions are interconnected in the form of an inverted U-shape, the bottom ends of both regions opening into a liquid tank and at least the bottom end of the first liquid-gas contacting region being submerged in the liquid in the tank. A liquid-gas contact process employs this contactor.

21 Claims, 6 Drawing Figures

LIQUID-GAS CONTACTOR AND LIQUID-GAS CONTACT PROCESS

BACKGROUND OF THE INVENTION (a) Field of the Invention

The present invention relates to a liquid-gas contactor suitable for treating a relatively great volume of gas. To be more precise, the present invention relates to a liquid-gas contactor which is useful in the lime and limestone wet scrubbing process. It also is useful as a waste gas desulfurization apparatus, a wet dust scrubber, a gas absorption apparatus, a water quencher, a humidifier and a deodorization apparatus. Various liquid absorbents such as sodium carbonate solution and caustic soda solution can be used therein.

(b) Description of the Prior Art

As the conventional liquid-gas contactors, there are generally known plate columns, packed towers, etc., but all of these are attended with various troubles so that it is impossible to adopt a high gas superficial velocity because it would require a means for reducing the entrainment of liquid and the pressure loss, and there would occur deposition of scales within the column when a slurry is employed like in the case of the limestone wet scrubbing process, and so forth.

Another liquid-gas contactor known heretofore is the bubble column reactor. However, this contactor has drawbacks such that it is necessary to devise a dispersing plate for the purpose of dispersing the gas in the liquid.

SUMMARY OF THE INVENTION

The present invention provides a liquid-gas contactor which is simple in structure and effective in operation. It is devised to eliminate the aforementioned troubles in the prior art by dispensing with the plates, packings or the like within the column. Rather, entrainment is positively induced to cause a plentiful liquid holdup within the apparatus and to generate a liquid-gas mixture current therein in order to utilize it for the liquid-gas contact. The invention also provides a liquid-gas contact process employing said liquid-gas contactor. Such an apparatus as proposed in the present invention and a process employing it are unprecedented.

The present invention relates to a liquid-gas contactor which comprises a first liquid-gas contacting region of which the lower part is provided with a gas inlet and the upper part is provided with a liquid feed inlet. The contactor also comprises a second region through which flows a gaseous fluid comprised of particles of at least a portion of the liquid fed into said first liquid-gas contacting region, the particles being suspended in the greater part of the gas supplied through the gas inlet. The first and second regions are inter-connected in an inverted U-shape, with the bottom parts of both regions extending into a liquid tank and the bottom end of the first liquid-gas contacting region being submerged in the liquid within the liquid tank. The invention also relates to a process employing this contactor.

DETAILED DESCRIPTION OF THE INVENTION

In the following will be explained the details of the liquid-gas contactor according to the present invention as well as the way to use this contactor with reference to gas absorption by means of a liquid (solvent).

Figure 1:
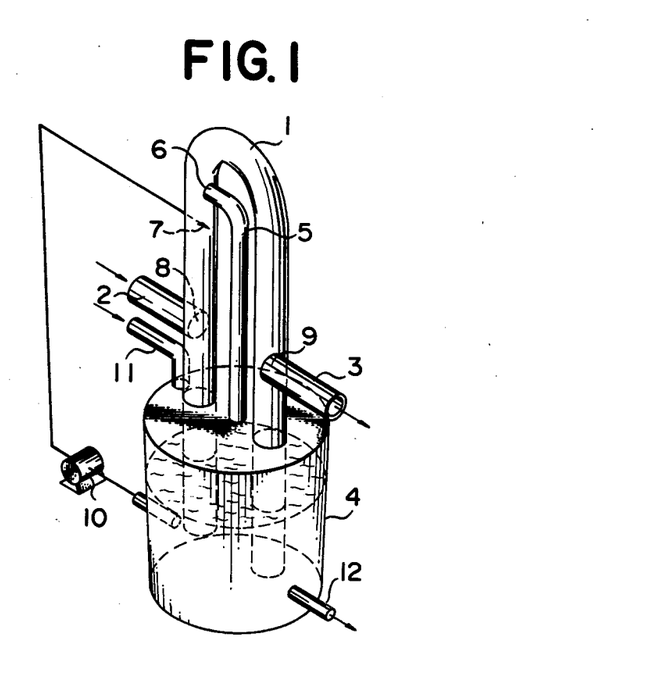
FIG. 1 is a perspective side view of an embodiment of the contactor according to the present invention.

FIG. 1 shows a preferred mode of practicing the present invention.

In FIG. 1, the reference numeral 1 denotes a gas absorption column, 2 denotes a gas inlet line, 3 denotes a treated gas outlet line, 4 denotes a solvent tank, and 5 denotes a gas recycle line. The gas absorption column 1 is of an inverted U-shape, and the lower part of one leg thereof is connected with the gas inlet line 2, the other leg thereof is connected with the treated gas outlet line 3, and the bottoms of both legs of the column are submerged in the solvent contained in the solvent tank 4. Above a gas inlet 8 in the gas absorption column 1 which communicates with the gas inlet line 2, there is provided an inlet 7 for the solvent which is supplied from the solvent tank 4 by means of a pump 10. The gas recycle line 5 is connected at one end thereof to the gas recycle inlet 6 of the gas absorption column which inlet is located slightly above the solvent inlet 7. The other end of the gas recycle line 5 is connected to the upper part of the solvent tank 4.

In a liquid-gas contactor of the structure described above, the gas to be treated is introduced into the absorption column 1 from the gas inlet line 2 by way of the gas inlet 8. There are instances where rectification of the gas might be effected in the vicinity of the inlet 8 depending on the velocity of the flowing gas current. Meanwhile, the solvent within the solvent tank 4 is fed to the absorption column 1 from the solvent inlet 7 by means of the pump 10. The solvent falling from the solvent inlet 7 contacts the gas ascending from the gas inlet 8, and forms a counter-current contacting region located between the solvent inlet 7 and the gas inlet 8. Therefore, by properly adjusting the elevation of the solvent inlet 7 in proportion to the velocity of gas flow, the length of said counter-current contacting region is determined. The solvent continues to descend while drawing therein the gas fed from the inlet 8 and forming a liquid-gas mixture flow (concurrent flow contacting region), and flows into the solvent tank 4 together with a portion of the gas. A first liquid-gas contacting region is comprised of the above described two regions. Said liquid-gas mixture flow is injected into the solvent tank 4, and the gas contained therein forms bubbles within the solvent tank, thereby contacting same with the solvent. A part of the gas rises to the upper end of the solvent tank 4, ascends within the gas recycle line 5, and is recycled to the gas absorption column 1. The gas which rises within the column from the gas inlet 8 contacts the liquid supplied from the inlet 7. Some of the liquid is entrained in the gas so that a mixture of gas and the entrained liquid rises in the column to the overhead thereof. The recycle gas supplied from inlet 6 is added thereto. Then the mixture of gas and entrained liquid flows through the overhead to the other leg of the column and thence downwardly therein. Thus, a gaseous fluid containing liquid particles flows in the second region which extends from the liquid inlet 7 to the gas outlet 9. The liquid-gas mixture flow is separated into the treated gas and solvent at the treated gas outlet 9 by virtue of the difference of inertia force, and the thus-separated solvent falls in the solvent tank 4 thereby to be recovered. Further, the solvent is fed to the solvent tank 4 from the solvent inlet line 11 and is discharged to the outside of the tank through the solvent outlet line 12.

The bottom portions of both legs of the gas absorption column 1 extend into the solvent tank 4. The bottom part of the first contacting region is submerged in the solvent within the tank to a depth that provides a liquid seal corresponding to the head of said region. The bottom part of the second region also is submerged in the solvent to the same extent.

The treated gas separated at the treated gas outlet 9 is released through the treated gas outlet line 3, but there are instances where it is further treated by means of a demister or like apparatus as occasion demands. Moreover, in the present apparatus, the whole region of the column can be designed to be of a concurrent flow type by disposing the solvent inlet 7 in the vicinity of the gas inlet 8. The overhead of the solvent tank 4 is connected to the gas absorption column 1 at a location on said column which permits the gas that accumulates in the overhead of the solvent tank to flow into the gas absorption column. Further, the second region of the gas absorption column 1 can be provided with packings, plates and other internals as far as the pressure loss permits.

Referring to the conditions for operation of the liquid-gas contactor according to the present invention, as for the gas superficial velocity hereinafter sometimes referred to by the symbol Ug, it is appropriate to be 3 m/sec. or higher, preferably in the range of from 4 to 20 m/sec., and more preferably in the range of from 5 to 15 m/sec. The appropriate liquid mass velocity L is in the range of from 40,000 to 500,000 Kg/m$^2$·hr.

Figure 2:
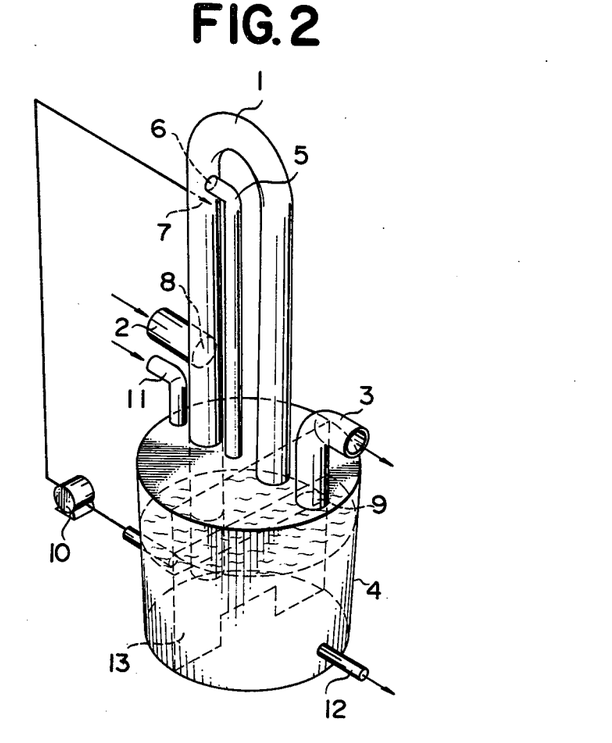
FIG. 2 is a perspective view of another embodiment of the contactor according to the present invention.

FIG. 2 illustrates another preferable mode of practicing the present invention.

In this example, separation of the treated gas from the solvent after passing through the second region is performed within the solvent tank 4. The solvent falls in the solvent tank 4 thereby to be recovered, while the treated gas is introduced into the solvent tank 4 and thereafter flows to the treated gas outlet line 3 through the treated gas outlet 9 provided in said tank 4. In order to prevent by-passing of the gas introduced into the solvent tank 4 through the bottom part of the first liquid-gas contacting region to the treated gas outlet 9, a partition plate 13 is provided in the solvent tank 4. This partition plate need not separate the solvent within the tank into separate compartments: it suffices to have a depth similar to the bottom part of the second region in the apparatus of FIG. 1. The gas introduced into the solvent tank passes to the outlet 9 after passing through the second region. Further, the pump 10 for recycling the solvent can be connected to the compartment on one side of the partition plate 13, as shown in FIG. 2, or it can be connected to the compartment on the opposite side of the partition plate.

Figure 3:
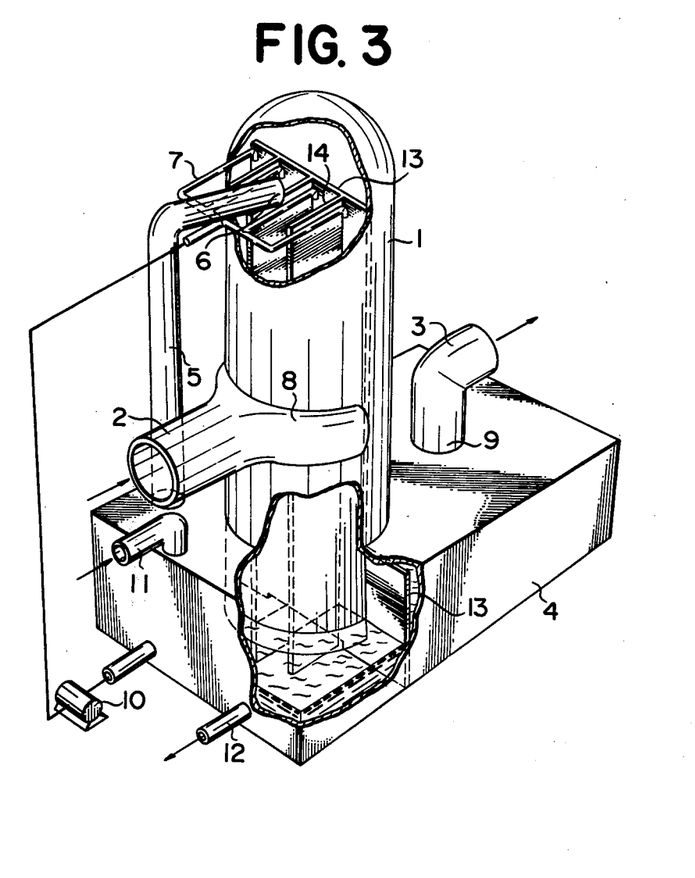
FIG. 3 is a perspective view, partly broken away, of still another embodiment of the contactor according to the present invention.

FIG. 3 illustrates still another preferable mode of practicing the present invention. This mode of practicing is characterized in that the gas absorption column 1 is constructed to have a cylindrical external shape. The partition plate 13 which is installed within the solvent tank 4 and is integrated with the lower part of the absorption column and extends upwardly to the vicinity of the overhead of the absorption column 1 thereby forming an inverted U-shape liquid-gas contacting region along both sides of the partition plate. It is also characterized in that the first liquid-gas contacting region is divided into plural sub-regions parallel to the flow of the fluid by means of separate partition plates 14.

Figure 3A:
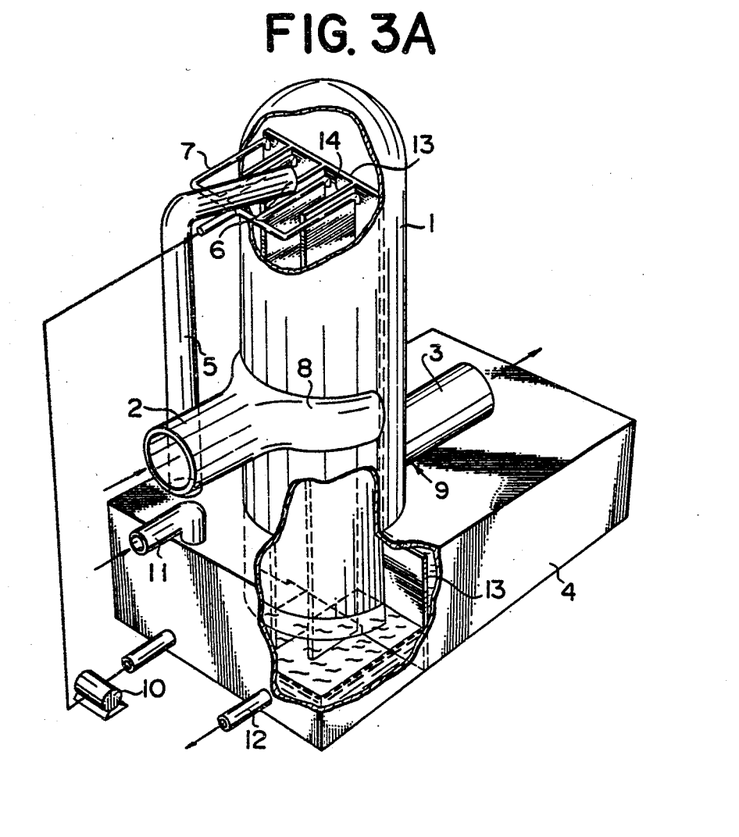
FIG. 3A is a perspective view, partly broken away, of another embodiment of the contactor according to the present invention. In these figures, the same parts are indicated by identical reference numerals.

FIG. 3A illustrates another contactor for practicing the present invention. FIG. 3A is identical to FIG. 3, except that the treated gas outlet 9 and the outlet line 3 extend sidewardly from the lower end of the column 1, similar to FIG. 1.

By virtue of the foregoing structure, contact between a great volume of gas and a liquid can be performed by the use of a compact apparatus.

An apparatus according to the present invention makes it possible to enhance the gas superficial velocity as set forth above, and because there are no internal parts as plates, packings, etc. within the contactor, it is simple in structure, the pressure loss can be minimized, and it is free from choking due to deposition of scales. Besides, because the entire inside regions of the absorption column as well as the solvent tank can be utilized as the liquid-gas contacting region, the liquid-gas contact efficiency is enhanced. Moreover, because the present apparatus is of a compact structure, the cost of manufacturing thereof is moderate.

EXAMPLE 1

By employing a liquid-gas contactor equipped with a dust scrubber having an inside diameter of 500 mm such as illustrated in FIG. 1, a waste gas containing dust having an average particle size of 20$\mu$ and a true density of 2.4 g/cm$^2$ was treated. The result was as shown in the following table.

| Concentration of dust at inlet g/Nm$^3$ | Velocity of gas fed in column m/sec. | Flow ratio of liquid to gas within column l/Nm$^3$ | Dust collection efficiency % |
|---|---|---|---|
| 0.02 | 3.8 | 5 | 99 |
| 0.27 | 4.6 | 6 | 98 |
| 0.45 | 5.2 | 5 | 95 |

EXAMPLE 2

By the use of the same liquid-gas contactor as employed in Example 1, a boiler waste gas containing 1,000 ppm of SO$_2$ and flowing at a gas superficial velocity of 5.2 m/sec. was made to contact with an aqueous solvent containing 5 wt.% of Na$_2$CO$_3$ which was supplied at the rate of 68,000 Kg/m$^2$·hr. As the result, the SO$_2$ removal percent was 98.5%.

EXAMPLE 3

An experiment for making an aqueous solvent of sodium hydroxide absorb an organic acid contained in air was conducted by the use of the apparatus illustrated in FIG. 2. The height of the inverted U-shape gas absorption column was 1.5 m, the inside diameter thereof was 50 mm, and the amount of absorbed acid was measured according to the ratio of the concentration at the inlet to the concentration at the outlet. The conditions for the experiment were as shown in Table-1 below.

Figure 4:
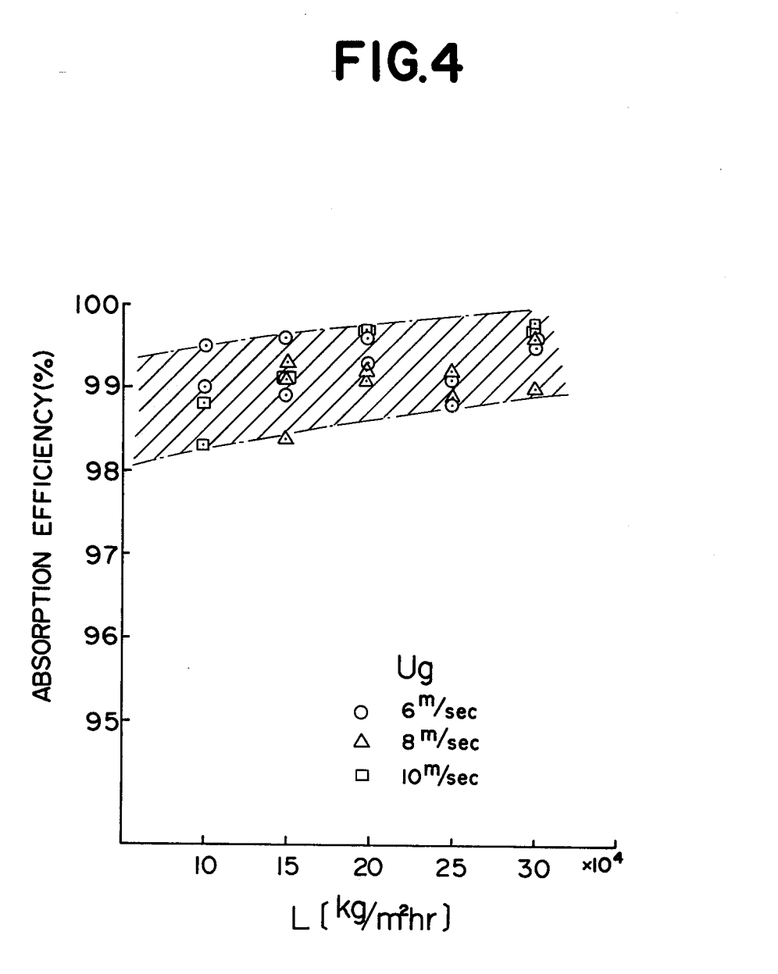
FIG. 4 shows the results of the experiments conducted in Example 3 and illustrates the relation between the operation conditions and the absorption efficiency.

As regards the process for analysis, the concentration of inlet gas was measured by the ultraviolet absorption method (U.V. wave length: 230 nm) upon making ethanol absorb the organic acid contained in the inlet gas. The concentration of the organic acid contained in the outlet gas was measured by employing the gas chromatography [glass column: 2 m, PEG20M (10%)+$H_3PO_4$ (0.5%), chromosorb WAW-DMCS]. The result of the experiment is shown in FIG. 4. The absorption efficiency was always more than 98%: this absorption increased with an increase in the amount of recycling liquid, but as to the effect of the gas superficial velocity, no conspicuous difference was observed.

Table 1

| Conditions for Experiment | |
|---|---|
| temperature of feed gas | 23° to 28° C. |
| temperature of recycling liquid | 41° C. |
| gas superficial velocity Ug | 6, 8, 10 m/sec. |
| liquid mass velocity L | 100,000 to 300,000 Kg/$m^2$ . hr. |
| concentration of feed alkali | 1.71 mole/l($\approx$ 6.8 wt. %) (constant) |
| amount of alkali solution fed | 1.8 l/hr. |
| initial density of alkali within tank | 0.86 mole/l($\approx$ 3.4 wt. %) |
| inlet concentration of organic acid and excess alkali ratio (Remark 1) | (content of tank: 150 l) |

| Ug [m/sec.] | Inlet concentration of organic acid [wt. ppm] | Excess alkali ratio |
|---|---|---|
| 6 (Remarks 2) | 3070 to 3170 | 1.17 to 1.20 |
| 8 | 1960 to 5500 | 0.98 to 2.75 |
| 10 | 2310 to 2580 | 1.45 to 1.62 |

(Remark 1) Excess alkali ratio = mole flow rate of alkali fed/mole flow rate of organic acid fed.
(Remark 2) Only in the case of Ug = 8 m/sec, the inlet concentration of organic acid varied within a wide range.

EXAMPLE 4

Liquid-gas contact between air and water was conducted by the use of an apparatus illustrated in FIG. 2, and the whole pressure loss in the column was measured. The inside diameter of the gas absorption column was 300 mm, and the height thereof was 4.5 m.

Figure 5:
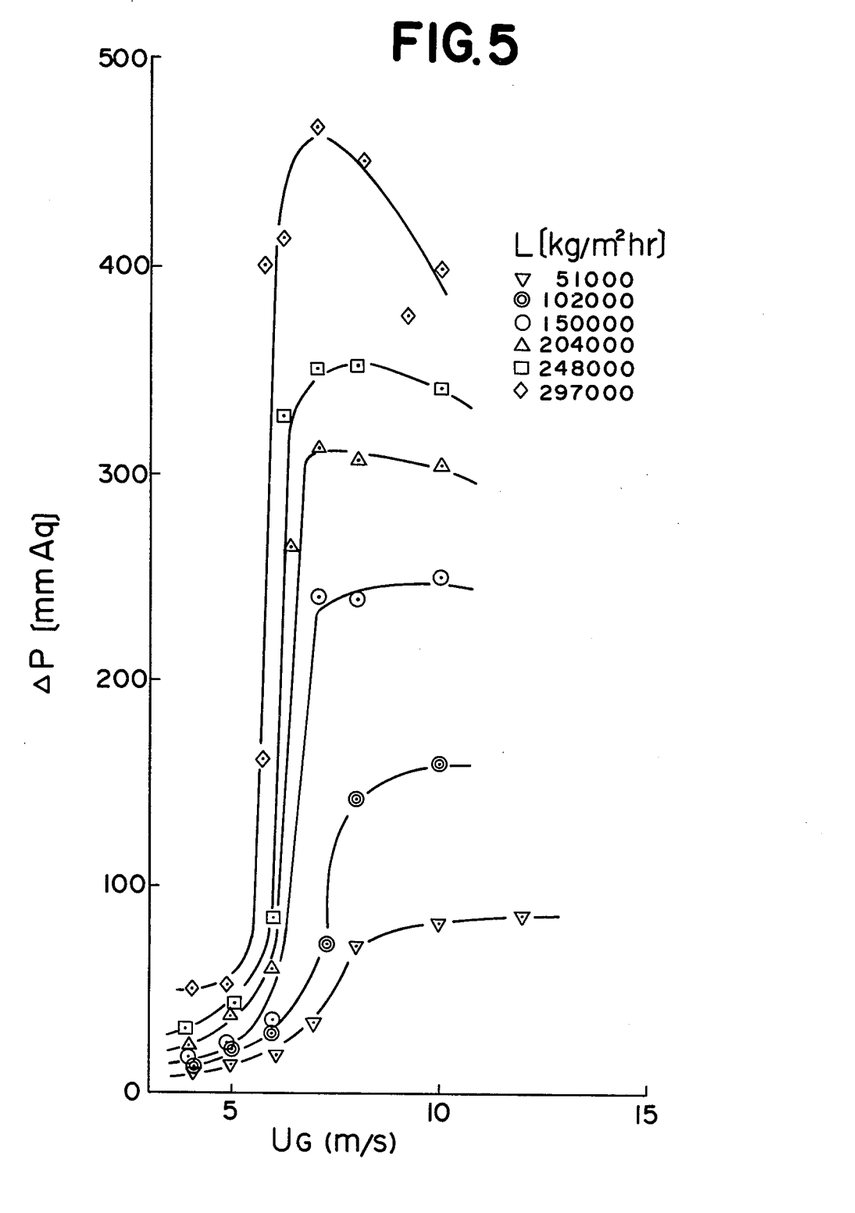
FIG. 5 shows the results of the experiments conducted in Example 4 and illustrates the relation between the gas superficial velocity and the pressure loss.

The values of pressure loss obtained through measurements conducted by varying the gas superficial velocity Ug and the liquid mass velocity L were as shown in FIG. 5. It is evident from this graph that when the gas superficial velocity Ug exceeds 5 m/sec, the pressure loss $\Delta P$ increases sharply and the liquid holdup within the column increases pursuant thereto, whereby a satisfactory liquid-gas contact was obtained.

What is claimed is:
1. A liquid-gas contactor, which comprises:
an absorption column having wall means defining a first upright conduit, a second upright conduit and a connecting conduit connected directly to and extending directly between the upper ends of said first and second conduits, said first upright conduit, said second upright conduit and said connecting conduit collectively defining an inverted U-shape flow path;
gas inlet means communicating with said first upright conduit and located thereon at a position close to the lower end thereof whereby gas to be treated is fed into said first upright conduit;
treating liquid inlet means communicating with said first upright conduit and located thereon at a position which is upwardly spaced from said gas inlet means whereby treating liquid is fed into said first upright conduit for contact with the gas fed in through said gas inlet means;
a closed tank which is partially filled with a bath of said treating liquid, said tank having an upper wall, the space between the upper surface of said treating liquid in said tank and said upper wall defining a gas chamber, the lower end of said first upright conduit communicating with said tank below the upper surface of said bath of treating liquid and opening into said bath so that treating liquid that flows downwardly through said first upright conduit flows into said bath of treating liquid, the lower end of said second upright conduit extending into said tank and opening thereinto;
a pump connected to said treating liquid inlet means and said tank for feeding a stream of said treating liquid from said tank to said treating liquid inlet means; and
a gas outlet for discharging gas from said contactor, said gas outlet being connected to said second upright conduit adjacent the lower end thereof above the upper surface of the treating liquid in said tank.
2. The liquid-gas contactor according to claim 1, in which the lower end of said second upright conduit is submerged in said bath of treating liquid in said tank and opens thereinto.
3. The liquid-gas contactor according to claim 2, in which said gas outlet is a conduit which extends sidewardly from said second upright conduit at a position thereon adjacent the lower end of said second upright conduit and above said tank.
4. The liquid-gas contactor according to claim 3, including a gas recycle conduit whose lower end communicates with said gas chamber and whose upper end is connected to said first upright conduit at a location above said treating liquid inlet means.
5. The liquid-gas contactor according to claim 1 including a plurality of upright partition walls in said first upright conduit dividing same into a plurality of separate upright passages, a plurality of said treating liquid inlet means, one of said treating liquid inlet means communicating with each of said passages.
6. The liquid-gas contactor according to claim 1 in which said wall means comprises a cylindrical housing having an upper end wall, an internal partition plate inside said housing and dividing the interior of said housing into said first upright conduit and said second upright conduit, said partition plate terminating vertically downwardly spaced from said upper end wall of said housing with the space between the upper end of said partition plate and said upper end wall of said housing defining said connecting conduit.
7. The liquid-gas contactor according to claim 1 in which said gas outlet is a conduit which extends sidewardly from said second upright conduit at a position thereon adjacent to the lower end of said second upright conduit and above said tank, the lower end of said second upright conduit terminating inside said tank and above the upper surface of said bath of treating liquid therein; and a partition inside said tank and extending upwardly across the space between the upper surface of said bath of treating liquid and the upper wall of said tank to divide said gas chamber into two separate compartments which are isolated from each other.

8. The liquid-gas contactor according to claim 7 including a gas recycle conduit whose lower end communicates with said one compartment of said gas chamber and whose upper end is connected to said first upright conduit at a location above said treating liquid inlet means.

9. A liquid-gas contactor, which consists essentially of:
an absorption column having wall means defining a first upright conduit, a second upright conduit and a connecting conduit connected directly to and extending directly beween the upper ends of said first and second conduits, said first upright conduit, said second upright conduit and said connecting conduit collectively defining an inverted U-shape flow path;
a closed tank having a bottom wall, a top wall and a side wall, said tank being mounted at the lower end of said absorption column and being partially filled with a bath of treating liquid, the space between the upper surface of said treating liquid and said top wall defining a gas chamber, the lower end of said first upright conduit penetrating through said top wall of said tank and extending downwardly into said tank with its lower end being submerged in said bath of treating liquid and opening thereinto, the lower end of said second upright conduit penetrating through said top wall of said tank and opening thereinto;
gas inlet means located on said first upright conduit at a position thereon close to the lower end thereof and above said tank whereby gas to be treated is fed into said first upright conduit;
treating liquid inlet means located on said first upright conduit at a position thereon close to the upper end thereof and vertically upwardly spaced from said gas inlet means whereby treating liquid is fed into said first upright conduit for contact with the gas fed in through said gas inlet means;
a pump connected to said treating liquid inlet means and said tank for feeding a stream of said treating liquid from said tank to said treating liquid inlet means; and
a gas outlet for discharging gas from said contactor, said gas outlet being connected to said second upright conduit adjacent the lower end thereof and above the upper surface of the treating liquid in said tank.

10. A liquid-gas contact process, which consists essentially of the steps of:
feeding a gas into the lower portion of a first upright conduit so that the gas flows upwardly at a gas superficial velocity in said first upright conduit in the range of from 5 to 20 m/sec and simultaneously flowing a treating liquid into the upper portion of said first upright conduit so that the liquid flows downwardly at a liquid mass velocity of at least about 40000 kg/m$^2$.hr in said first upright conduit whereby said gas rising in said first upright conduit contacts said liquid falling in said first upright conduit in countercurrent flow relationship in a contacting region between the locations at which said gas and said liquid are fed into said first upright conduit so that a part of said gas is drawn into a part of said liquid and flows downwardly from said contacting region and the remainder of said gas and the remainder of said liquid flow upwardly from said contacting region;
flowing said part of said gas and said part of said liquid downwardly through said first upright conduit and discharging same into a bath of said treating liquid below the upper surface of said bath wherein said bath is contained in a closed tank whereby said part of said gas rises above said bath;
feeding said remainder of the gas and said remainder of the liquid in concurrent flow relationship upwardly through said first upright conduit, thence through a reversely curved flow path and thence downwardly through a second upright conduit;
discharging said remainder of said liquid from the lower end of said second upright conduit into said bath and discharging said remainder of said gas separately from said remainder of said liquid.

11. The liquid-gas contact process according to claim 10 in which said remainder of said liquid is discharged into said bath below the upper surface of said bath and said remainder of said gas is discharged from the lower end of said second upright conduit above said tank.

12. The liquid-gas contact process according to claim 11 including the step of feeding the gas that rises aove said bath to the upper portion of said first upright conduit at a location which is above the location at which liquid is flowed into said first upright conduit.

13. The liquid-gas contact process according to claim 10, in which said remainder of said gas is discharged from said tank at a location above the upper surface of said bath and isolated from said part of said gas discharged into said tank through said first upright conduit.

14. The liquid-gas contact process according to claim 13 including the step of feeding said part of said gas that rises above said bath to the upper portion of said first upright conduit at a location which is above the location at which liquid is flowed into said first upright conduit.

15. A liquid-gas contact process, which consists essentially of the steps of:
feeding a gas into the lower portion of a first upright conduit so that the gas flows upwardly at a gas superficial velocity in said first upright conduit in the range of from 5 to 20 m/sec and simultaneously flowing a treating liquid into said first upright conduit so that the liquid flows downwardly at a liquid mass velocity of at least about 40000 kg/m$^2$.hr in said first upright conduit, said treating liquid being flowed into said first upright conduit at a location above the location at which said gas is flowed into said first upright conduit whereby said gas rising in said first upright conduit contacts said liquid falling in said first upright conduit in countercurrent flow relationship in a contacting region between the locations at which said gas and said liquid are fed into said first upright conduit;
flowing a part of said liquid downwardly through said first upright conduit and discharging same into a bath of said treating liquid below the upper surface of said bath wherein said bath is contained in a closed tank;
feeding the gas and the remainder of the liquid in concurrent flow relationship upwardly through said first upright conduit, thence through a reversely curved flow path and thence downwardly through a second upright conduit;

discharging the remainder of the liquid from the lower end of said second upright conduit into said bath and discharging the gas separately from the remainder of the liquid.

16. A liquid-gas contactor, which comprises:

an absorption column having wall means defining a first upright conduit, a second upright conduit and a connecting conduit connected directly to and extending directly between the upper ends of said first and second conduits, said first upright conduit, said second upright conduit and said connecting conduit collectively defining an inverted U-shape flow path;

gas inlet means communicating with said first upright conduit and located thereon at a position close to the lower end thereof whereby gas to be treated is fed into said first upright conduit;

treating liquid inlet means communicating with said first upright conduit and located thereon at a position which is upwardly spaced from said gas inlet means whereby treating liquid is fed into said first upright conduit for contact with the gas fed in through said gas inlet means;

a closed tank which is partially filled with a bath of said treating liquid, said tank having an upper wall, the space between the upper surface of said treating liquid in said tank and said upper wall defining a gas chamber, the lower end of said first upright conduit communicating with said tank below the upper surface of said bath of treating liquid and opening into said bath so that treating liquid that flows downwardly through said first upright conduit flows into said bath of treating liquid, the lower end of said second upright conduit extending into said tank and opening thereinto;

a pump connected to said treating liquid inlet means and said tank for feeding a stream of said treating liquid from said tank to said treating liquid inlet means; and a gas outlet for discharging gas from said contactor, said gas outlet being connected to said tank above the upper surface of the treating liquid in said tank.

17. The liquid-gas contactor according to claim 16, in which the lower end of said second upright conduit terminates inside said tank and above the upper surface of the bath of treating liquid therein and communicates with said gas chamber, said gas outlet is a conduit communicating with said gas chamber above the upper surface of the bath of treating liquid therein, and including a partition inside said tank and extending upwardly across the space between the upper surface of the bath of treating liquid and the upper wall of said tank and dividing said gas chamber into two separate compartments which are isolated from each other, the lower end of said first upright conduit extending through one of said compartments, said second upright conduit and said gas outlet communicating directly with the other of said compartments.

18. The liquid-gas contactor according to claim 17 including a gas recycle conduit whose lower end communicates with said one compartment of said gas chamber and whose upper end is connected to said first upright conduit at a location above said treating liquid inlet means.

19. The liquid-gas contactor according to claim 16 including a plurality of upright partition walls in said first upright conduit dividing same into plurality of separate upright passages, a a plurality of said treating liquid inlet means, one of said treating liquid inlet means communicating with each of said passages.

20. The liquid-gas contactor according to claim 16 in which said wall means comprises a cylindrical housing having an upper end wall, an internal partition plate inside said housing and dividing the interior of said housing into said first upright conduit and said second upright conduit, said partition plate terminating vertically downwardly spaced from said upper end wall of said housing with the space between the upper end of said partition plate and said upper end wall of said housing defining said connecting conduit.

21. A liquid-gas contactor, which consists essentially of:

an absorption column having wall means defining a first upright conduit, a second upright conduit and a connecting conduit connected directly to and extending directly between the upper ends of said first and second conduits, said first upright conduit, said second upright conduit and said connecting conduit collectively defining an inverted U-shape flow path;

a closed tank having a bottom wall, a top wall and a side wall, said tank being mounted at the lower end of said absorption column and being partially filled with a bath of treating liquid, the space between the upper surface of said treating liquid and said top wall defining a gas chamber, the lower end of said first upright conduit penetrating through said top wall of said tank and extending downwardly into said tank with its lower end being submerged in said bath of treating liquid and opening thereinto, the lower end of said second upright conduit penetrating through said top wall of said tank and opening thereinto;

gas inlet means located on said first upright conduit at a position thereon close to the lower end thereof and above said tank whereby gas to be treated is fed into said first upright conduit;

treating liquid inlet means located on said first upright conduit at a position thereon close to the upper end thereof and vertically upwardly spaced from said gas inlet means whereby treating liquid is fed into said first upright conduit for contact with the gas fed in through said gas inlet means;

a pump connected to said treating liquid inlet means and said tank for feeding a stream of said treating liquid from said tank to said treating liquid inlet means; and a gas outlet for discharging gas from said contactor, said gas outlet being connected to said tank above the upper surface of the treating liquid in said tank.

* * * * *